United States Patent [19]

Calloue et al.

[11] 3,959,450
[45] May 25, 1976

[54] PREPARATION OF PURE BROMINE FROM AQUEOUS HYDROBROMIC ACID SOLUTIONS

[75] Inventors: Georges Calloue; Jean Hughes, both of Port-de-Bouc, France

[73] Assignee: Octel-Kuhlmann, Paris, France

[22] Filed: Sept. 16, 1974

[21] Appl. No.: 506,596

[30] Foreign Application Priority Data

Sept. 25, 1973 France .......................... 73.34250

[52] U.S. Cl. ............................ 423/507; 423/500; 423/505
[51] Int. Cl.² ......................................... C01B 7/00
[58] Field of Search ............ 423/500, 505, 507, 501

[56] References Cited
UNITED STATES PATENTS

| | | | |
|---|---|---|---|
| 2,143,223 | 1/1939 | Heath | 423/503 |
| 2,359,221 | 9/1944 | Kenaga | 423/500 |
| 3,098,716 | 7/1963 | Gradishar | 423/501 |
| 3,107,154 | 10/1964 | Shacter | 423/501 |

*Primary Examiner*—L. Dewayne Rutledge
*Assistant Examiner*—Michael L. Lewis
*Attorney, Agent, or Firm*—Pennie & Edmonds

[57] ABSTRACT

Pure liquid bromine is produced directly from an acidic aqueous bromide mother liquor by reacting it with about 80 to about 90% of the amount of chlorine stoichiometrically equivalent to the bromide present in the whole supplied mother liquor and collecting the liquid bromine which separates out of solution; the remaining mother liquor free from liquid bromine is steam distilled in the presence of sufficient chlorine to convert the rest of the bromide to bromine and to condense crude liquid bromine which is purified by washing with sufficient fresh mother liquor. Production capacity is increased by about 20% compared to conventional process in which all the bromine is submitted to steam distillation.

2 Claims, 1 Drawing Figure

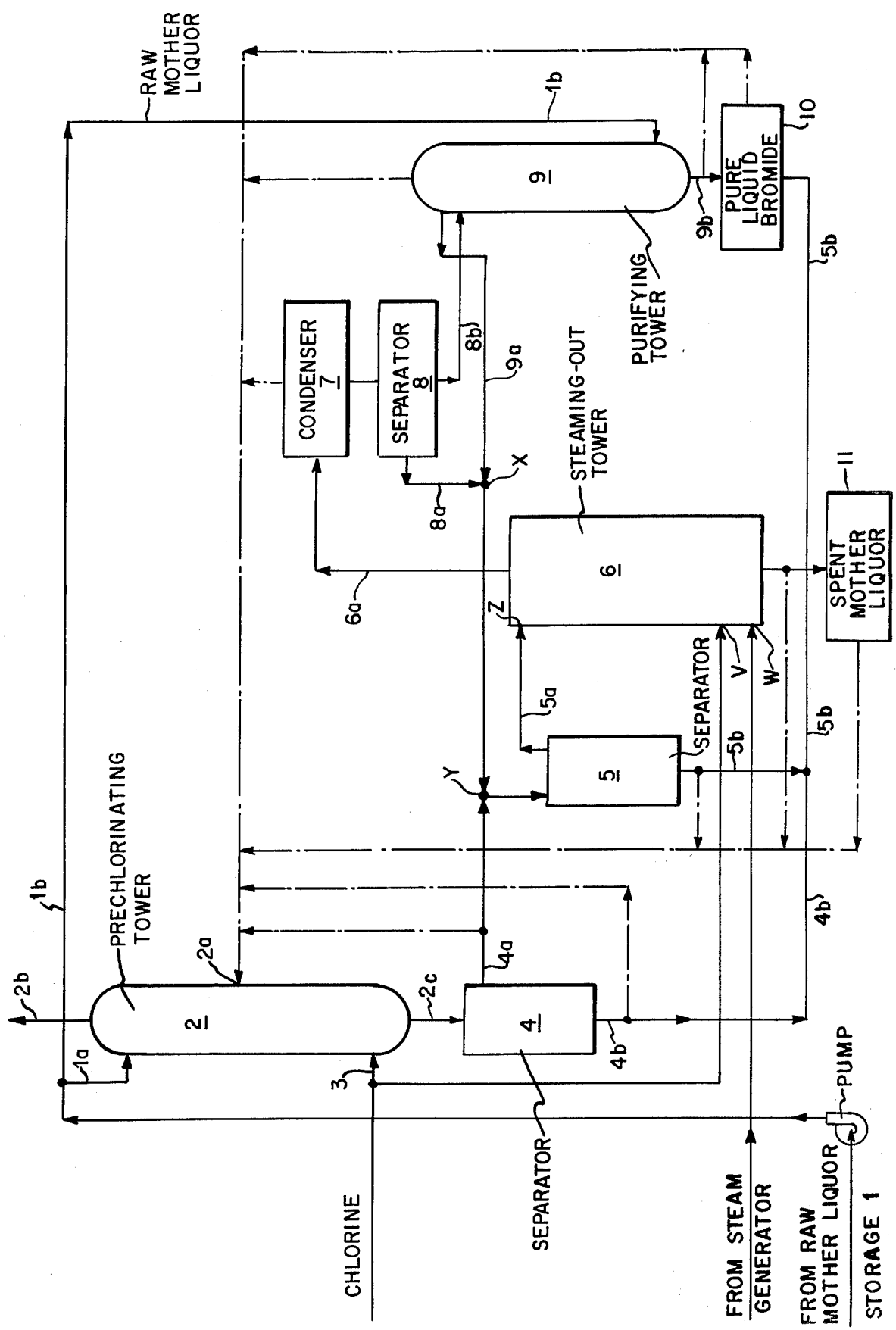

PREPARATION OF PURE BROMINE FROM AQUEOUS HYDROBROMIC ACID SOLUTIONS

BACKGROUND OF THE INVENTION

The present invention provides an improved process for preparing bromine by reaction of chlorine with aqueous hydrobromic acid solutions.

The primary essential raw material for preparation of bromine is sea water. More than 90% of commercially manufactured bromine is prepared from open sea water having a bromine content from 60 to 70 mg/liter.

Concentrated solutions of hydrobromic acid are generally prepared from sea water according to the so-called "acid process" of Dow described in British Pat. No. 523,607 whereby the sea water is first acidified to a pH of about 3 to 4, then treated with sufficient chlorine to liberate bromine by the well-known reaction 2 $NaBr + Cl_2 \rightarrow NaCl + Br_2$. The bromine formed is vaporized by aeration or by vacuum and then fixed, a preferred reaction for fixation being with sulfur dioxide according to the equation $Br_2 + SO_2 + 2H_2O \rightarrow 2HBr + H_2SO_4$. When a "sea water concentrate" is obtained in this manner, this concentrated bromide or hydrobromic acid solution, also identified herein as the "mother liquor", has a composition typically in the ranges of about 0.12 to 0.15 kilograms of hydrogen bromide per liter, about 0.005 to 0.01 kilograms of of hydrogen chloride per liter and about 0.09 to 0.11 kilograms of $H_2SO_4$ per liter. The pH of this mother liquor varies around zero.

Pure liquid bromine is conventionally obtained from this mother liquor by the action of chlorine in three stages.

In a first "prechlorination" step, the mother liquor is treated with only part of the amount stoichiometrically required to convert all the bromide therein to bromine, this first amount being limited to less than the amount which would result in separation of any liquid bromine, being thus no greater than sufficient to form a saturated solution of bromine in the mother liquor.

In a second "extraction" or "steaming-out" step, the prechlorinated mother liquor is simultaneously treated with the remainder of the chlorine required to convert the bromide to bromine, together with steam to effect steam distillation of the total bromine.

In a third "purification" step, the bromine condensed from the steam distillation is treated with an additional small amount of mother liquor, about 5 to 10% based on the initial weight used thereof.

Conventionally, it has not been considered practicable to prechlorinate with more than about two-thirds of the stoichiometric quantity of chlorine necessary to convert all the bromide in the mother liquor to bromine. Otherwise, liquid bromine separates out and contaminates the system. The process is aimed at keeping bromine in either the dissolved or the vapor state until it is condensed after the steaming-out tower. The prechlorination provides a head-start to making elemental bromine available, but the complete conversion by chlorine of bromide to bromine is not accomplished until the temperature of the reactants is around 100°C in the steaming-out tower. At this point, it is the practice to use chlorine in an amount such that the total chlorine used is in slight excess of stoichiometric, about 1% in excess.

The operation of the process between the prechlorination and steaming-out steps has accordingly been directed toward strict avoidance of forming any liquid phase of bromine in the pipes connecting the two stages, particularly in the hydraulic guard or trap provided to keep the vapor phase of the steaming-out tower free of liquid bromine.

The steaming-out tower for the second conventional step operates in the vapor state at close to 100°C. The stream from the prechlorination step, comprising a solution of bromine in hydrobromic acid mother liquor, enters the top of the steaming-out tower while the second charge of chlorine and the steam enter at the bottom. It is advantageous for the steaming-out tower to have a large capacity, exemplarily 3 or 4 times the volume of the prechlorination tower.

The mixture of water vapor and bromine vapor leaving the top of the steaming-out tower is then condensed and the liquid bromine and hot aqueous acid are separated, such as by decantation, from each other. The hot aqueous acid is recycled to the steaming-out tower.

The liquid bromine must be purified from small quantities of chlorine resulting from the use of an excess of chlorine to ensure complete conversion of all the bromide. The excess chlorine which is about 0.1 to 1% based on the weight of liberated bromine, must be eliminated to meet commercial specifications. This is accomplished in the third step of the prior-art procedure wherein the bromine is washed in a "purification tower" with exemplarily a 5 to 10% aliquot of the starting hydrobromic acid mother liquor.

SUMMARY OF THE INVENTION

While studying the operation of a conventional bromine manufacturing plant such as above described, present inventors have found a means of increasing such a plant's production capacity by about 20%. This advantageous result is obtained surprisingly by ignoring the precaution of the prior art regarding the avoidance of liquid bromine during prechlorination. By increasing the chlorine used in this first step to up to about 90% of the stoichiometric amount, a substantial yield of pure liquid bromine can be produced and collected before sending the mother liquor on to the usual steaming-out step.

The liquid bromine produced in this manner has been found to be practically free of chlorine and to meet all the usual specifications commercially required of pure liquid bromine. This permits its direct transmittal to storage for shipment without further purification. This also effects a decrease of up to 20% or more in the quantity of bromine treated in the purifier.

Another important advantage provided by the instant invention is that it permits increasing the overall bromine production of an installation without consumption of additional steam and without increasing the dimensions of the steaming-out tower.

Briefly stated, the instant invention provides a method for producing a fraction of pure liquid bromine from an aqueous bromide mother liquor which method comprises reacting said mother liquor with about 80% to about 90% of the amount of chlorine stoichiometrically equivalent to the bromide present in the whole supplied liquor and collecting the liquid bromine which separates out of solution.

The instant invention also provides an overall process incorporating said method for producing a fraction of pure liquid bromine, said process being a method for preparing bromine from an aqueous bromide mother liquor comprising the steps of i. reacting said mother liquor with about 80% to about 90% of the amount of chlorine stoichiometrically equivalent to the bromide present in the whole supplied liquor, to produce pure liquid bromine and bromine dissolved in the mother liquor, ii. separating substantially all of said pure liquid bromine from the mother liquor, iii. steam distilling the separated mother liquor in the presence of sufficient chlorine to convert substantially all of the remaining bromide to bromine and condensing crude liquid bromine, and iv. washing said crude liquid bromine with sufficient fresh mother liquor to lower the chlorine content of the bromine.

DETAILED DESCRIPTION

In the improved complete process of this invention for recovering substantially all of the bromide in a sea-water concentrate as bromine, a considerably large fraction of this bromine is collected directly in the form of pure liquid bromine under conditions which do not require the addition of heat energy. The temperature of the prechlorination step, as well as the subsequent phase separation steps, can be within a few degrees of ambient temperature and can exemplarily be between about 15 and 30°C.

After it leaves the prechlorinating tower, the mixture of liquid bromine and supernatant mother liquor containing dissolved bromine is put through a separating system placed between the outlet of the prechlorination column and the inlet of the extraction or steaming-out column.

The separating system can be any arrangement capable of effecting a substantially complete separation of liquid bromine from the supernatant aqueous phase. Separation by gravity such as by simple decantation is preferred.

In order to realize full benefit of the improvement in the overall process according to this invention, the separation system must accomplish separation of substantially all the liquid bromine formed before the stream of mother liquor reaches the steaming-out tower. Thus there must be collected not only the liquid bromine which is present at the outlet from the prechlorination tower but also any liquid bromine which may be formed in the pipes carrying the stream to the steaming-out tower, such as would result from a cooling of said stream.

In view of the recycling of the hot acid solution as generally carried out at the steaming-out tower, present inventors prefer to place a separator before the point of reintroduction of said hot solution and to install at a point under the trap or hydraulic guard preceding the steaming-out tower, a second separation in order to insure removal of all traces of liquid bromine which may have escaped from the first decantation. The second or finishing separation can, of course, be somewhat smaller than the first separator.

The equipment used for the procedure of this invention must be made from materials, such as ceramics, resistant to wet bromine and aqueous hydrobromic acid. Quartz or pyrex vessels or pyrex-lined towers are conveniently used. Although glass and tile piping have been used extensively, connections of polytetrafluoroethylene are particularly advantageous.

DESCRIPTION OF THE DRAWING

The improved process according to the instant invention will now be further described in greater detail with reference to the accompanying drawing which represents schematically a typical installation for the operation thereof.

The HBr solution of raw mother liquor to be treated is pumped from storage reservoir (1), 90% to 95% of this solution being introduced (1a) at the top of the prechlorination tower (2) while correspondingly 10% to 5% thereof as required for bromine purification is delivered (1b) at the bottom of purifier (9).

The prechlorination tower or column (2) is made of pyrex filled with Pall rings of porcelain.

About 90% of the total chlorine required to release bromine from the hydrobromic acid is delivered to the bottom of prechlorination column (2) through pipe systems (3). This chlorine reacts practically instantaneously with the acid solution. The various vents (indicated in broken lines) from the installation are connected to the mid-section of tower (2), at (2a) and the gases there come into contact with hydrobromic acid in the upper section of the tower, which effects recovery of the bromine and chlorine present in the outlet gases while the inert gases are evacuated to the atmosphere at (2b).

The mixture of bromine solution in hydrobromic acid with liquid bromine delivered (2c) at the bottom of column (2) is put through a pyrex gravity separator (4) situated just before the point of recycling the hot acid solutions. The liquid bromine (4b) separated at this stage, corresponding to about 20% of the total yield, is sent to bromine storage tank (10).

The separated mother liquor (4a) containing dissolved bromine, to which hot recycled acids are added at Y, then arrives at a second pyrex gravity separator (5) situated at the bottom of the trap preceding the point of introduction Z to the steaming-out tower (6) for steam distillation of the HBr solution of Br. This arrangement effects the separation of the last traces of liquid bromine whic have escaped from the first separator (4). The liquid bromine (5b) here collected is likewise sent to storage tank (10).

The steaming-out or extraction tower (6) is constructed of acid-resistant brick-lined steel filled with porcelain Pall rings and receives the HBr solution of Br at its top (6a). At the bottom at V there is injected the remaining necessary chlorine —i.e. about 10% of the total required chlorine. At W steam is injected to effect the extraction of both the remaining bromine previously formed in the prechlorinator and the bromine formed within the steaming-out tower itself. It is preferred to introduce the chlorine far enough above the steam inlet so that no chlorine is carried into the outgoing mother liquor. The temperature in the steaming-out tower (6) is exemplarily 100°C in its lower section and 90°C in its higher section.

The mixture (6a) of bromine vapor and water vapor obtained from tower (6) is condensed in condenser (7), then the separator (8) effects the separation of the condensed liquid bromine (8b) from the condensed hot aqueous acids (8a) which are recycled to the steaming-out tower (6), being mixed at point X with the used wash liquor (9a) discharged from the purifier (9) and in turn at point Y with the aqueous phase (4a) separated at separator (4).

The liquid bromine (8b) is then directed through the pyrex purification tower (9) where it is washed by aforementioned portion (1b) of the raw mother liquor. The liquid bromine (9b) obtained at the outlet of the purifier is sent to the storage tank (10) where it is mixed with the liquid bromine previously recovered at the respective outlets of separators (4) and (5).

When equipment such as above described is used to treat mother liquors containing per liter about 0.12 to 0.15 kilograms hydrobromic acid, about 5 to 10 grams hydrochloric acid and about 0.09 to 0.11 kilograms sulfuric acid, a bromine is produced corresponding to the commercial specifications, in particular with regard to its chlorine content which is of the order of about 100 to 1000 parts per million. The water content is about 300 to 400 ppm and the solid residue is about 0 to 50 ppm.

The effluent recovered from the bottom of the steaming-out tower (6) and stored in tank (11) has a composition in the ranges of about 1 to 3 grams bromine, about 50 to 70 grams hydrochloric acid and about 90 to 120 grams sulfuric acid per liter. This effluent is used to acidify the sea water from which fresh mother liquor is prepared to be processed by the improved method of this invention.

The following example illustrates in a non-limiting manner the application of the method according to this invention for the production of liquid bromine from an aqueous acid mother liquor containing bromide or hydrobromic acid.

EXAMPLE

In a plant such as schematically represented in the attached drawing, the prechlorination tower (2) was filled with Pall rings of two-inch size and had an effective capacity of one cubic meter. This tower was fed at the top with 11,000 liters/hour (or 12,800 Kg/hr) of HBr solution at 25°C. The HBr solution had the composition 136.0 grams/liter of bromine in the form of HBr, 7.1 grams/liter of chlorine in the form of HCl, 102.9 grams/liter of $H_2SO_4$. At the same time, tower (2) was fed at the bottom with 635 Kg/hour of gaseous chlorine at 25°C.

In the separator (4) situated at the outlet of tower (2), the yield is 280 Kg/hr of liquid bromine. The stream of thus depleted solution of bromine in HBr mother liquor is combined with a stream of hot acids recycled from the steaming-out tower (6) (via separator (8)) plus 600 l/h or 700 Kg/h of mother liquor used to purify condensed bromine in purifier (9). The combined stream passes into separator (5) where 50 kg/hr more liquid bromine is collected.

Thus the total amount of decanted liquid bromine is 330 Kg/hr. This is sent directly to tank (10) without passing through the purification tower (9).

At the head of the steaming-out tower (6) the supply inflow is 13,805 Kg/hr. of the combined stream leaving separator (5) and containing (a) the original mother liquor freed of the bromine collected in separators (4) and (5), (b) the recycled hot acids and (c) the residual HBr from the purifier.

Steaming-out tower (6) is filled with Pall rings of 1, 1.5, and 2 inch size and has a useful capacity of 3.5 cubic meters. Tower (6) is fed with 75 Kg/hr. of gaseous chlorine at 25°C and 2,300 Kg/hr. of expanded steam.

At the top of steaming-out tower (6) a mixture of bromine vapor and water vapor is emitted and is condensed in condenser (7) and passes into separator (8). At the outlet of separator (8) there is collected the aqueous hot acid for recycling in the steaming-out tower (6) and the liquid bromine which is delivered to the purification tower (9) after cooling to about 30°C and from there to the bromine tank (10) at a rate of 1207 Kg/hr.

Finally, at the bottom of the steaming-out tower (6) there is collected 14,952 Kg/hr. of an effluent acid at 100°C which is sent after suitable cooling to the tank (11). This effluent acid contains 28 Kg/hr. more bromine in the form of hydrobromic acid.

We claim:

1. A method for producing substantially pure liquid bromine from an aqueous mother liquor or sea-water concentrate containing per liter about 0.12 to 0.15 kilograms hydrogen bromide, about 5 to 10 grams hydrochloric acid and about 0.09 to 0.11 kilograms sulfuric acid, which method comprises a. supplying a fraction I comprising about 90-95% by weight of said liquor to a prechlorinating stage in step (b) and supplying a fraction II comprising the remaining about 10-5% of the liquor to a washing or purifying stage in step (e);

b. prechlorinating liquor fraction I by reacting it with about 80-90% of the weight of chlorine stoichiometrically equivalent to the total weight of bromide supplied in both fractions I and II, to produce a substantial first yield of substantially pure liquid bromine and also elementary bromine dissolved in liquor fraction I;

c. separating liquor fraction I containing dissolved bromine from the first pure liquid bromine and collecting said first substantially pure liquid bromine directly without distillation;

d. steam-distilling the separated liquor fraction I containing dissolved elementary bromine, in the presence of sufficient chlorine to bring the total amount of chlorine used in steps (b) and (d) to about 101% of the weight of chlorine stoichiometrically equivalent to the total weight of bromide originally in fractions I and II, and condensing crude liquid bromine containing chlorine as an impurity;

e. washing said crude liquid bromine substantially free of chlorine by contacting it with liquor fraction II defined in step (a), to produce a second yield of substantially pure liquid bromine and to convert the chlorine impurity to chloride dissolved in fraction II; and f. separating said fraction II from the second substantially pure liquid bromine and collecting the second pure liquid bromine.

2. In a process for producing liquid bromine from an aqueous mother liquor containing, per liter, about 0.12 to 0.15 kilograms hydrogen bromide, about 5 to 10 grams hydrochloric acid and about 0.09 to 0.11 kilograms sulfuric acid, which process comprises prechlorinating the mother liquor with a fraction of the chlorine stoichiometrically equivalent to said bromide, to form elementary bromine dissolved in the liquor; steam-distilling the prechlorinated liquor containing dissolved bromine in the presence of additional chlorine to condense crude liquid bromine; and washing the crude liquid bromine with aqueous bromide liquor to yield substantially pure liquid bromine;

the improvement which comprises prechlorinating with sufficient chlorine to form a substantial yield of a separate phase of substantially pure liquid bromine in addition to the elementary bromine dissolved in the liquor, and separating said substantially pure liquid bromine from the liquor containing dissolved elementary bromine before steam-distilling the latter, thus collecting a substantial fraction of the total yield of substantially pure liquid bromine without requiring its steam distillation or washing.

* * * * *

UNITED STATES PATENT AND TRADEMARK OFFICE
CERTIFICATE OF CORRECTION

PATENT NO. : 3,959,450
DATED : May 25, 1976
INVENTOR(S) : Georges Calloue and Jean Hugues It is certified that error appears in the above-identified patent and that said Letters Patent are hereby corrected as shown below:

First page, the second inventor should read
-- Jean Hugues--.

Column 1, line 28, "of of" should read --of--.

Column 4, line 43, "whic" should read --which--;

line 49, "(6a)" should read --,Z--.

Signed and Sealed this

Seventeenth Day of August 1976

[SEAL]

Attest:

RUTH C. MASON
Attesting Officer

C. MARSHALL DANN
Commissioner of Patents and Trademarks